Patented Mar. 30, 1954

2,673,815

UNITED STATES PATENT OFFICE 2,673,815

PROCESS OF TREATING ASPHALT WITH PHOSPHORUS SESQUISULFIDE

John D. Bartleson, Beachwood Village, Ohio, assignor to The Standard Oil Company, Cleveland, Ohio, a corporation of Ohio No Drawing. Application November 4, 1950,
Serial No. 194,185

4 Claims. (Cl. 106—273)

The present invention relates to a process for the preparation of asphalt-containing compositions of improved adhesive properties, and more particularly to a process for combining asphalt with phosphorus sesquisulfide dispersed in an oil and to the asphalt-containing product obtainable by such process.

The service life of a road's surface is determined in part by the ability of asphalt material in bituminous road matte to resist the action of water. Unless the asphalt material shows adhesion to aggregate, heavy rains which penetrate the matte and wet the aggregate will wash the aggregate free of asphalt. This action continued over a sufficient period of time will tear the pavement apart.

Heretofore, attempts to solve this problem have been directed to altering the wetting characteristics of the aggregate by treatment thereof with water-soluble detergents or wetting agents. Materials which have been suggested for this purpose include sulfuric acid or aryl sulfonic acid esters of lower primary alcohols, wax, tall oil, sulfur compounds and oil-soluble, water-insoluble heavy metal salts.

Additives have also been incorporated in asphalt in order to improve its wetting properties. A number of such additives have been recommended in the patent literature, including fats, fatty acids, heavy metal soaps, oleylamine, waxes, and synthetic organic compounds having detergent or wetting properties. These additives are undesirable because they lose their effectiveness in use or in storage.

It is the object of the invention to combine asphalt with phosphorus sesquisulfide in a manner which substantially increases the asphalt's adhesion to aggregate while employing smaller amounts of phosphorus-sesquisulfide than have heretofore been possible.

In accordance with this invention, asphalt which does not meet the adhesion requirements of the Ohio test is combined with an amount of phosphorus sesquisulfide ($P_4S_3$) dispersed in an oil miscible with asphalt, at a temperature and for a time sufficient to bring the asphalt to an adhesion within the requirements of the said test.

Phosphorus sesquisulfide has been combined with asphalt heretofore in order to improve its properties. Thus, Patent No. 2,340,640, dated February 1, 1944, to Robert E. Burk, assigned to The Standard Oil Company, proposes the addition of phosphorus sesquisulfide to asphalt. However, it has now been found that the addition of the phosphorus sesquisulfide in the form of a dispersion in an oil will substantially increase the adhesion of asphalt to aggregate obtainable by a given amount of phosphorus sesquisulfide.

Patent No. 2,450,756 to A. J. Hoiberg, dated October 5, 1948, and assigned to the Lion Oil Company, describes the addition of phosphorus sesquisulfide to vacuum pipe still bottoms, followed by air blowing. The phosphorus sesquisulfide acts as a catalyst to effect the oxidation of the crude residua. It has been demonstrated that air-blown vacuum pipe still bottoms with $P_4S_3$ as a catalyst during the air-blowing does not meet asphalt adhesion requirements to aggregate, and that air-blown asphalt cement to which $P_4S_3$ is added after the air-blowing has a satisfactory adhesion.

It will be perceived that the objects achieved in accordance with the invention include the provision of asphalts of highest quality and their preparation by combining a lower quality asphalt with phosphorus sesquisulfide in dispersion form in an oil in an amount to bring the adhesion of the asphalt up to the desired quality standard.

The term "asphalt" as used herein is applied to an asphalt suitable for direct use in highway work and also for other purposes, and includes asphalts brought to a consistency desired for a particular use, either by distillation or by mixing or fluxing with a harder or a softer asphalt, as the case may be. The term includes natural asphalt, such as asphaltic rocks, tars and pitches obtained in the distillation of coal or wood, petroleum residues, cracking oil tars, etc. The invention is particularly adapted for use with asphalt cements from petroleum sources. Asphalt cements are petroleum residues which have been reduced to a penetration in the range from about 40 to about 200.

The adhesion of asphalt to aggregate can be evaluated by the Ohio State Department of Highways Supplemental Specification Test M-205.1 which is available from the Department of Highways, State of Ohio at Columbus, Ohio.

In this test the asphalt is evaluated as follows: 100 grams of standard reference stone composed of 50% silica gravel and 50% crushed limestone graded to pass a ⅜ inch sieve and to be retained on a ¼ inch sieve is dried one-half hour at 275° F. and coated with 5 grams of asphalt by mixing with a spatula for three minutes. The mixture is spread thinly on a plate and allowed to cure at a laboratory temperature for one hour. The mixture is then immersed in distilled water at 180° F. for one-half hour, after which the number of particles showing stripping is determined. In order to pass the test, the material must show a coating value of at least 95%, i. e., a stripping from not over 5% of the aggregate particles.

Asphalts prepared in accordance with this invention are evaluated by the above test, hereinafter called the "Ohio Test."

As the oil miscible with asphalt in which the phosphorus sesquisulfide may be dispersed there are employed mineral oils derived from petroleum, such as virgin light and heavy gas oil, catalytic light gas oil, various reduced crudes, cylinder stock, light wax slop fractions, gas oil, catalytic heavy gas oil, paraffin distillate, fuel oils of various viscosities and boiling ranges, such as virgin diesel oil, No. 2 and No. 4 fuel oil, and heavy fuel oil, kerosene, solvent extract neutral stock, solvent extract bright stock, white oil, bright stock, Nos. 225 and 300 Red Oil (acid-refined Mid-Continent mineral oils having viscosities of 225 SUS and 300 SUS at 100° F.), Zero pale oil (a mineral oil of lubricating viscosity), catalytic diesel oil, polyolefin oil, coal tar cracking fractions, and tar separator bottoms. Vegetable oils, such as coconut oil and lard oil, and tall oil, are also employed, alone or in a mixture with mineral oils. These oils are all liquids at the temperature of addition of the phosphorus sesquisulfide to the asphalt cement, and have a boiling point that is high enough to permit their retention in the mixture at temperaturs at which the asphalt mixture is held in order to develop the improved adhesion.

It is immaterial whether the phosphorus sesquisulfide is soluble or insoluble in the oil employed.

The $P_4S_3$-oil dispersion is formed by combining solid phosphorus sesquisulfide with the oil in an amount to form a pourable dispersion or solution. Phosphorus sesquisulfide is simply suspended in the organic liquid and stirred thoroughly until a uniform dispersion or solution is obtained. As the concentration of $P_4S_3$ is increased, the viscosity of the dispersion also increases. Because of this, the upper limit of $P_4S_3$ concentration is determined by the pumpability of the dispersion. This is also dependent upon the initial viscosity of the oil. Ordinarily the dispersion will contain from about 2 to about 80% $P_4S_3$.

The concentration of phosphorus sesquisulfide in the dispersion is not critical, inasmuch as the amount of dispersion added to the asphalt to provide the desired $P_4S_3$ concentration may readily be adjusted to conform with the $P_4S_3$ concentration in the dispersion.

The dispersion prepared as described is blended with the asphalt, with agitation, in an amount to provide a phosphorus sesquisulfide concentration therein in the range of from 0.06% to 0.25%. The dispersion may be added thereto at any temperature at which the asphalt is sufficiently fluid to permit thorough mixing. For convenience, it ordinarily is added at the temperature at which the asphalt is normally stored, i. e., at from 300 to 450° F. The mixture is then stored at a temperature and for a time sufficient to bring the asphalt to an adhesion within the requirements of the Ohio Test. The conditions employed will depend in part on the asphalt and in part on the amount of additive present.

It has been found in accordance with the invention that maintenance of a temperature in the range of about 200 to about 500° F. for from ½ to 100 hours, the lower the temperature the longer the time and vice versa, will increase the adhesion of an asphalt which does not meet the Ohio Test 95% adhesion requirement to a value within this requirement. At temperatures below about 200° F., the asphalt is no longer sufficiently fluid, whereas at temperatures above about 500° F. oxidation or polymerization of the asphalt may occur. If the asphalt contains 0.125% $P_4S_3$ and a temperature in the range of 300 to 400 F. and a combined time of from ½ to 2 hours are employed, the asphalt will have an adhesion of from 98 to 100% in the Ohio Test, and therefore these conditions are preferred. There is no upper limit to the heating time since continued heating after the required period has elapsed will do no harm. The heating, being a function of time, temperature and amount of phosphorus sesquisulfide, is not critical and the proper conditions to employ in view of circumstances will be obvious to those skilled in the art from the above description.

The following examples are of interest in connection with the various methods of preparing the improved asphalt in accordance with the invention.

*Example 1*

$P_4S_3$-mineral lubricating oil slurries were prepared containing about 50% $P_4S_3$. These were added to asphalt cement from a Mid-Continent crude (penetration 70–80 at 77° F.) at 300° F. with stirring in amounts from 0.125% and 0.25% to provide a phosphorus sesquisulfide concentration in the asphalt of 0.06 to 0.12% by weight. The asphalts so prepared were conditioned at 300° F., with stirring, and stored for 4½ hours at the same temperature. The asphalts were then tested in accordance with the Ohio Test, and the results were as follows:

| Percent $P_4S_3$ 50% Slurry | Actual $P_4S_3$ Concentration in Asphalt | Percent Aggregate coated |
|---|---|---|
| 0 | 0 | 40 |
| 0.125 | 0.06 | 98.5 |
| 0.125 | 0.06 | 97 |
| 0.125 | 0.06 | 95 |
| 0.25 | 0.12 | 96 |
| 0.25 | 0.12 | 97.5 |
| 0.25 | 0.12 | 99.5 |
| 0.25 | 0.12 | 99 |
| 0.25 | 0.12 | 98.5 |
| 0.25 | 0.12 | 99 |
| 0.25 | 0.12 | 99 |
| 0.5 | 0.25 | 99 |

In order to show the importance of adding the phosphorus sesquisulfide in dispersion form the following tests were run: Solid phosphorus sesquisulfide was added to asphalt cement from a Mid-Continent crude under nitrogen to give an amount of phosphorus sesquisulfide in the range of 0.08–0.5% by weight of the asphalt. The mixtures were then stirred for one-half hour at 300° F. in nitrogen and then stored for an additional 4 hours at this same temperature. The resulting asphalts were tested by the Ohio Test, with the following results:

| Percent $P_4S_3$ | Percent Aggregate coated |
|---|---|
| 0 | 40 |
| 0.08 | 88 |
| 0.125 | 91 |
| 0.16 | 86 |
| 0.25 | 97 |
| 0.50 | 99 |

These tests show that at least 0.25% solid $P_4S_3$ is needed to obtain results equivalent to those obtained when 0.06% $P_4S_3$ is added dispersed in an oil.

Example 2

In order to demonstrate the increased effectiveness of a phosphorus sesquisulfide-oil dispersion in accordance with the invention, compared to solid phosphorus sesquisulfide, and to phosphorus pentasulfide in both solid and slurry form, the following tests were run:

Asphalt cement from a Mid-Continent crude having a penetration of 70–80 at 88° F. was heated to 300° F. under a nitrogen atmosphere. The inert atmosphere prevented serious loss in penetration during the test and also eliminated the possibility of oxidation or spontaneous combustion of solid phosphorus sesquisulfide during the addition thereof to the asphalt.

To separate samples of the asphalt, solid $P_4S_3$ or $P_2S_5$, or a 50% dispersion of $P_4S_3$ or $P_2S_5$ in No. 225 Red Oil (an acid-refined mineral lubricating oil having a viscosity of 225 SUS at 100° F.) were then added in an amount to provide 0.125% $P_4S_3$ or $P_2S_5$ in the asphalt, and the mixtures stirred for ½ hour at 300° F. under nitrogen to insure complete blending and then stored an additional 4 hours at 300° F. under nitrogen. The samples were then given the Ohio Test, with the following results:

| Additive in Asphalt Cement | Percent by Wt. of Solid Additive | Percent Aggregate Coated |
|---|---|---|
| $P_4S_3$ (solid) | 0.125 | 91 |
| $P_4S_3$ (oil slurry) | 0.125 | 96–99 |
| $P_2S_5$ (solid) | 0.125 | 93 |
| $P_2S_5$ (oil slurry) | 0.125 | 80 |

It is evident from the above tabulation that a phosphorus sesquisulfide dispersion in a mineral lubricating oil is considerably more effective than solid phosphorus sesquisulfide alone. Moreover, the surprising effect of the oil in the case of phosphorus sesquisulfide is made more striking by the fact that phosphorus pentasulfide is less effective when added in the form of a dispersion in the same mineral oil than solid phosphorus pentasulfide.

Penetration tests were run on a sample of asphalt prior to and after addition of 0.125% of a 50% $P_4S_3$ mineral lubricating oil slurry, with the following results:

| Sample | Penetration at 77° F.[1] | | |
|---|---|---|---|
| | (A) | (B) | (C) |
| Asphalt derived from a Mid-Continent crude | 69 | 62 | 39 |
| Asphalt derived from a Mid-Continent crude plus 0.125% of a 50% $P_4S_3$ oil slurry | | 58 | 43 |

[1] The penetration at (A) is the initial penetration. Columns (B) and (C) show the penetration of the mixture before and after the storage of the asphalt for four hours at 300° F. under nitrogen.

It is evident from these results that the phosphorus sesquisulfide dispersion does not accelerate oxidation of the asphalt to any appreciable extent.

Example 3

The effect of storage time in improving the asphalt adhesion is shown in the following test:

0.25% of a 50% phosphorus sesquisulfide mineral oil slurry was thoroughly mixed with asphalt samples which were then maintained at 300° F. for periods of different length and then tested by the Ohio Test. The results are:

| Percent $P_4S_3$ | Combined Mixing and Storage Time, Hours | Percent Aggregate Coated |
|---|---|---|
| 0.125 | ½ | 74 |
| 0.125 | 1 | 78 |
| 0.125 | 1½ | 92 |
| 0.125 | 2 | 98 |

Asphalt cement which did not contain the additive after 2½ hours at 300° F. gave a 36% coating and after 5 hours at 300° F. a 58% coating.

Samples of asphalt derived from a Mid-Continent crude containing 0.125%, 0.25% and 0.50% of a 50% phosphorus sesquisulfide slurry in mineral oil were heated at 400° F. for varying times. The samples gave the following results in the Ohio Test:

| Percent $P_4S_3$ Slurry | Percent $P_4S_3$ | Percent Aggregate Coated | | |
|---|---|---|---|---|
| | | ½ Hr. | 1½ Hrs. | 6 Hrs. |
| 0.125 | 0.06 | 96 | 96 | 96 |
| 0.25 | 0.12 | 96 | 99 | 97 |
| 0.50 | 0.25 | 97 | 97 | 97 |

It is evident that when a temperature of 300° F. is employed the asphalt must be heated for at least 1½ hours before the conditions of the Ohio Test are met, whereas at 400° F. a heating time of ½ hour is more than ample.

Example 4

To a number of samples of asphalt derived from a Mid-Continent crude were added an amount of a 50% phosphorus sesquisulfide slurry in No. 225 Red Oil (an acid-refined mineral oil of lubricating viscosity) to provide a 0.125% $P_4S_3$ concentration in the asphalt. The asphalt was heated at a temperature of 300° F. under nitrogen while the phosphorus sesquisulfide slurry was being added, mixed over a ½ hour period and stored without stirring for varying lengths of time. The asphalts were tested in the Ohio Test with the following results:

| Sample | Mix Time (hours) | Storage Time (hours) | Percent Aggregate Coated |
|---|---|---|---|
| 1 | 0.5 | 0 | 74 |
| 2 | 0.5 | 0.5 | 78 |
| 3 | 0.5 | 1.0 | 92 |
| 4 | 0.5 | 1.5 | 98 |
| 5 | 0.5 | 2.0 | 97 |
| 6 | 0.5 | 4.0 | 96–99 |
| 7 | 0.5 | 4.5 | 97 |

The results of these tests show that at a storage temperature of 300° F. a combined mix and storage time of 2 hours is necessary. By comparison, at 400° F. a mix time of 0.5 hour (and no additional storage time) (Example 3) is sufficient.

Example 5

Slurries were made up containing 50% $P_4S_3$ dispersed in coconut oil, wax slops, lard oil, tall oil and light gas oil.

The slurries were then added to asphalt cement at 300° F. under nitrogen, in an amount equal to 0.125% by weight of the asphalt (to provide 0.06% $P_4S_3$) mixed for 3½ hours at 300° F. and then stored for 4 hours at the same temperature. After testing the samples by the Ohio Test, the following results were obtained:

| Dispersion Medium | Percent Aggregate Coated |
|---|---|
| Coconut oil | 97 |
| Wax slops | 97.5 |
| Lard oil | 98 |
| Tall oil | 97 |
| Light gas oil | 97 |

In the above examples the asphalt is conditioned under an atmosphere of nitrogen in order to prevent oxidation of the asphalt with a consequent decrease in its penetration. Instead of nitrogen, other inert gases such as carbon dioxide or steam may be employed. Since decreased penetration is not always undesirable, there is no objection to conditioning the asphalt mixture in a blanketing atmosphere of air or where the surface of the asphalt cement to air is small compared to the volume so that there is a minimum of oxidation.

The nature of the action which takes place during the process of the invention is unknown. It is possible that the phosphorus sesquisulfide and the oil react chemically, in view of the required storage time of the additive in the asphalt before the asphalt will pass the Ohio Test, but there is no evidence which would tend to confirm such a possibility.

It will be noted that there are a number of variables in making the phosphorus sesquisulfide dispersion and also in making the final asphalt additive reaction product. These variables cover relatively large ranges. While variations within these ranges result in additive and asphalt compositions of somewhat different properties, all are, however, effective for meeting the adhesion of asphalt and none of the variables are critical in this regard. It is intended that all variations which fall within the foregoing claims are included within the scope of the invention.

All parts and percentages in the specification and claims are by weight.

I claim:

1. A process of preparing an asphalt composition, which comprises mixing an asphalt having poor adhesion properties with about 0.125% by weight of $P_4S_3$ dispersed in an oil miscible with the asphalt, and heating the mixture at a temperature in the range of about 300° to 400° F. for a time of from one-half to two hours to improve the adhesion of the asphalt to aggregate.

2. The process of claim 1 in which the oil miscible with the asphalt is an oil of mineral origin.

3. The process of claim 1 in which the oil miscible with the asphalt is a vegetable oil.

4. A process of preparing an asphalt composition, which comprises mixing an asphalt having poor adhesion properties with about 0.06 to 0.25% by weight of $P_4S_3$ dispersed in an oil miscible with the asphalt, and heating the mixture at a temperature in a range of about 300° to 400° F. for a time of from one-half hour to two hours to improve the adhesion of the asphalt to aggregate.

JOHN D. BARTLESON.

References Cited in the file of this patent

UNITED STATES PATENTS

| Number | Name | Date |
|---|---|---|
| 2,340,640 | Burke | Feb. 1, 1944 |
| 2,450,756 | Hoiberg | Oct. 5, 1948 |